J. T. TROTTER.
TIRE.
APPLICATION FILED MAY 20, 1916.
1,213,557. Patented Jan. 23, 1917.
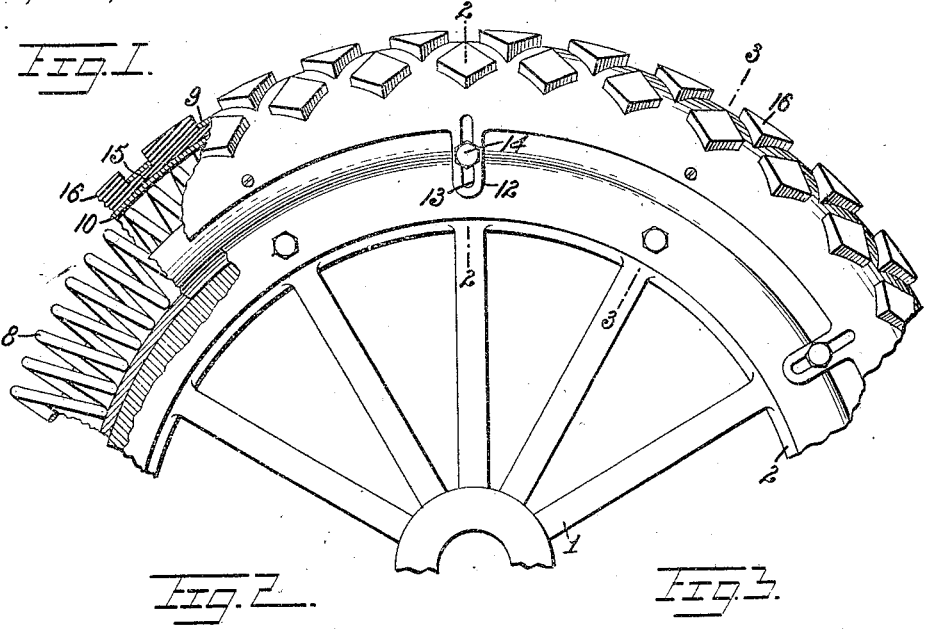
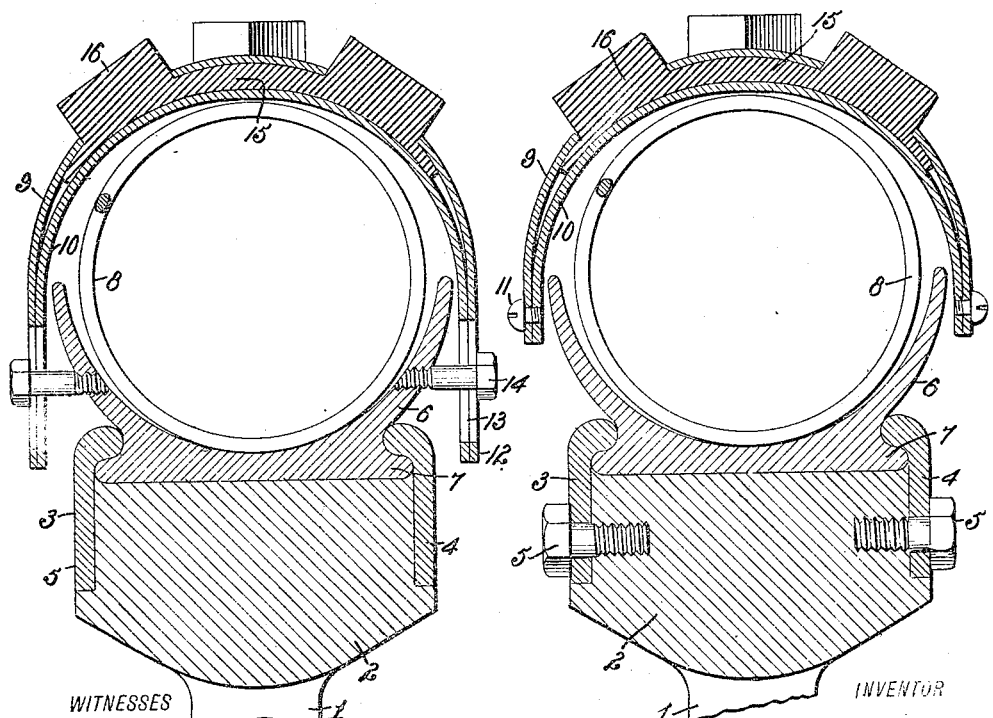
WITNESSES
H. T. Walker
A. L. Kitchin
INVENTOR
John T. Trotter
BY
ATTORNEYS

UNITED STATES PATENT OFFICE.

JOHN THOMAS TROTTER, OF NEW YORK, N. Y.

TIRE.

1,213,557. Specification of Letters Patent. Patented Jan. 23, 1917.

Application filed May 20, 1916. Serial No. 98,727.

*To all whom it may concern:*

Be it known that I, JOHN T. TROTTER, a citizen of the United States, and a resident of the city of New York, borough of Brooklyn, in the county of Kings and State of New York, have invented a new and Improved Tire, of which the following is a full, clear, and exact description.

This invention relates to tires and particularly to a non-puncturable tire which gives substantially the same effect as the ordinary pneumatic tire now commonly in use.

The object in view is to provide a resilient tire for wheels which is simple, strong and effective and which does not depend upon air for giving the cushioning effect.

Another object in view is to provide a tire with a spring and associated parts including rubber cushioning blocks for giving the same appearance and the same effect as the ordinary pneumatic tire now commonly in use.

A still further object in view is to provide a resilient tire in which the resiliency is produced by a plurality of independent members acting together.

In the accompanying drawing: Figure 1 is a fragmentary side view of a tire and part of a wheel partly in section embodying the invention. Fig. 2 is a section through Fig. 1 on line 2—2, the same being on an enlarged scale. Fig. 3 is a section through Fig. 1 on line 3—3, the same being on an enlarged scale.

Referring to the accompanying drawing by numerals, 1 indicates a wheel and 2 the felly thereof to which is secured clamping plates 3 and 4 by any suitable means, as for instance, screws 5. The clamping plates 3 and 4 overlap a metallic rim 6, which rim is provided with beads 7 interlocking the clamping plates and with a hollow or grooved portion for receiving a coiled spring 8, said coiled spring extending entirely around the periphery of the rim 6. The spring 8 may be of any strength and may thereby be caused to produce any desired resiliency, the size and strength of the spring corresponding to the load which it is designed to carry. Surrounding the spring 8 or partially surrounding the same are arc-shaped covering members 9 and 10 formed preferably of metal and preferably somewhat resilient, these members being connected together by suitable screws 11. The covering members 9 and 10 are provided with a plurality of depending lugs 12 in which slots 13 are formed, said slots accommodating the bolts 14 connected to the rim 6 so as to prevent any creeping of the covering members.

As shown more particularly in Figs. 2 and 3 of the drawing the covering members are connected at their inner edges but at their outer peripheral portion are separated an appreciable distance so as to accommodate the rubber cushioning band 15, which cushioning band is provided with a plurality of radially extending lugs 16, said lugs extending through apertures in the covering member 9. Other material having substantially the same characteristic as rubber may be substituted for members 15 and 16. By using these members not only is the tire given substantially the appearance of the ordinary tire now in use but rubber gripping members will be provided for gripping the surface of the ground and for acting as cushioning members which transmit the strain to the covering member 10, which covering member takes up some of the strain but transmits most of the strain to the spring 8.

It will thus be seen that by the resiliency of members 9 and 10 three distinct cushioning means are provided for the tire, namely, spring 8, covering members 9 and 10 and the rubber strip 15 with its lugs 16. The rubber cushioning band 15 together with the lugs 16 may be made of one piece if desired and placed in position before the screws 11 are placed in position, or they may be made in separate sections and inserted independently. The covering members 9 and 10, however, are complete rings and transmit strain to the spring 8 and distribute the strain therefrom. The covering member 10 is sufficiently resilient to allow any particular section or part to be depressed so as to take up local inaccuracies or roughness of the road, thus simulating the action of a pneumatic tire.

What I claim is:

In a device of the character described, a covering member for a tire comprising an inner ring arc-shaped in cross section, an outer ring arc-shaped in cross section, said outer ring being arranged in contact with the inner ring at the edges and spaced from the inner ring along its peripheral line, means for rigidly securing said outer ring and said inner ring together, said rings being formed of metal, said outer ring having a plurality of apertures therein, and a cushioning member arranged between said rings, said cushioning member being formed with projections extending through said apertures.

JOHN THOMAS TROTTER.